US012483469B2

(12) United States Patent
Syed et al.

(10) Patent No.: US 12,483,469 B2
(45) Date of Patent: Nov. 25, 2025

(54) REMOTELY CONTROLLING A USER DEVICE FUNCTION

(71) Applicant: Truist Bank, Charlotte, NC (US)

(72) Inventors: Ejaz Ahmed Syed, Morrisville, NC (US); Jason Pedone, Raleigh, NC (US); Randy Lee Cramp, Rolesville, NC (US); Venkat Praveen Reddy Muthannagari, Raleigh, NC (US)

(73) Assignee: TRUIST BANK, Charlotte, NC (US)

( * ) Notice: Subject to any disclaimer, the term of this patent is extended or adjusted under 35 U.S.C. 154(b) by 5 days.

(21) Appl. No.: 18/634,921

(22) Filed: Apr. 13, 2024

(65) Prior Publication Data

US 2025/0323826 A1    Oct. 16, 2025

(51) Int. Cl.
*H04L 41/0686* (2022.01)
*G06F 8/71* (2018.01)
*H04L 41/082* (2022.01)
*H04L 41/22* (2022.01)

(52) U.S. Cl.
CPC ............ *H04L 41/0686* (2013.01); *G06F 8/71* (2013.01); *H04L 41/082* (2013.01); *H04L 41/22* (2013.01)

(58) Field of Classification Search
CPC ... H04L 41/0686; H04L 41/082; H04L 41/22; G06F 8/71
See application file for complete search history.

(56) References Cited

U.S. PATENT DOCUMENTS

| | | | | |
|---|---|---|---|---|
| 9,268,561 | B1* | 2/2016 | Srinivasa | G06F 9/44536 |
| 12,182,283 | B1* | 12/2024 | Dortch | G06F 21/6209 |
| 2008/0097724 | A1* | 4/2008 | Morris | G06F 1/163 |
| | | | | 702/187 |
| 2009/0077090 | A1* | 3/2009 | Pacifici | G06F 9/5072 |
| 2013/0159122 | A1* | 6/2013 | Biswas | G06Q 10/06 |
| | | | | 705/26.1 |
| 2014/0099936 | A1* | 4/2014 | Pousti | H04W 4/60 |
| | | | | 455/419 |
| 2017/0141968 | A1* | 5/2017 | Lloyd | H04L 67/55 |
| 2019/0272161 | A1* | 9/2019 | Hughes | G06F 8/61 |
| 2020/0366694 | A1* | 11/2020 | Kolbitsch | H04L 63/1416 |
| 2025/0007777 | A1* | 1/2025 | Chibon | G06F 8/76 |

\* cited by examiner

*Primary Examiner* — Oanh Duong
(74) *Attorney, Agent, or Firm* — Michael A. Springs, Esq.; Shumaker, Loop & Kendrick, LLP; Patrick B. Horne

(57) ABSTRACT

A system and a method for remotely controlling a user device function include: a computing system having a processor executing computer-readable instructions stored in a storage device; a network connection operatively connecting multiple user devices to the computing system; and wherein the computing system executes the instructions to perform, for each of the user devices, steps comprising: sending an application code to the user device, the code including multiple code portions each associated with a function performed by the user device upon execution of the associated code portion; sending a data set to the user device including multiple settings stored by the user device, each of the settings associated with one of the code portions; and sending a toggle signal to the user device remotely causing the user device to update one of the stored settings thereby enabling or disabling the function associated with the one stored setting.

20 Claims, 4 Drawing Sheets

REMOTELY CONTROLLING A USER DEVICE FUNCTION

FIELD

This invention relates generally to the field of digital communications between user devices and enterprise systems. More particularly, the present disclosure relates to a digital feature toggle system for remotely controlling user device functions.

BACKGROUND

Computer users, with reference to users of desktop computing devices, laptop computing devices, public kiosk computing devices, and mobile phone devices, are accustomed to performing various functions when communicating with enterprise systems. These functions are controlled by web applications and mobile applications provided by the enterprise systems. Some of these applications allow the user to turn on and off a particular function such as a specific alert.

Typically, the enterprise system cannot change the application functions in real time. For web applications, changes such as updates and new banners are made by taking down the current website page and replacing it with a new page. For mobile applications, the new version must go through an approval procedure by Apple and Google before it is available to the users from the respective app stores. This approval procedure can take days.

The inability to quickly change functions being performed by the applications is a particular problem when an abnormal situation occurs such as where an increased amount of communication traffic to an enterprise system website significantly slows response times or even crashes the website. Thus, improvements are needed to enable users to maintain communication and reasonable response times with an enterprise system during abnormal operating conditions.

BRIEF SUMMARY

Embodiments of the present invention address the above needs and/or achieve other advantages by providing apparatuses and methods that remotely control functions being performed by user devices.

Embodiments of the invention include a system for remotely controlling a user device function, the system comprising: a computing system including a processor and a non-transitory storage device, wherein the processor executes computer-readable instructions stored in the storage device; a network connection operatively connecting multiple user devices to the computing system; and wherein, upon execution of the computer-readable instructions, the computing system performs, for each of the user devices, steps comprising: sending an application code to the user device, the application code including multiple code portions each associated with a function performed by the user device upon execution of the associated code portion by the user device; sending a data set to the user device, the data set including multiple settings stored by the user device, each of the settings associated with one of the code portions; and sending a toggle signal to the user device remotely causing the user device to update one of the stored settings thereby enabling or disabling the function associated with the one stored setting.

The computing system monitors communication traffic sent by the user devices over the network connection and, when an abnormal condition of the communication traffic is detected, automatically sends the toggle signal based upon the detected abnormal condition. Alternatively or in addition. the computing system monitors communication traffic sent by the user devices over the network connection and, when an abnormal condition of the communication traffic is detected, sends the toggle signal in response to a manual input to the computing system.

The computing system monitors communication traffic sent by the user devices over the network to detect abnormal conditions, the computing system including a digital feature toggle system having a database storing a plurality of toggle options, wherein when one of the abnormal conditions is detected the digital feature toggle system evaluates the detected abnormal condition and selects one of the toggle options to control the sending of the toggle signal. The selected toggle option can control sending the toggle signal to disable the function. The selected toggle option can control sending the toggle signal to less than all of the user devices connected to the network connection. The selected toggle option can control sending the toggle signal to only ones of the user devices connected to the network and executing a predetermined version of the application code.

The toggle signal can disable the function and include duration information whereby the disabled function is enabled after a predetermined time from the disabling has elapsed based upon the duration information. The toggle signal can disable the function and the one stored setting can include duration information whereby the associated code portion enables the disabled function after a predetermined time from the disabling has elapsed based upon the duration information.

Embodiments of the invention include a method for remotely controlling a user device function, the method comprising the steps of: providing a computing system including a processor and a non-transitory storage device, wherein the processor executes computer-readable instructions stored in the storage device; establishing network connection operatively connecting multiple user devices to the computing system; and wherein, upon execution of the computer-readable instructions, the computing system performs, for each of the user devices, the following steps, sending an application code to the user device, the application code including multiple code portions each associated with a function performed by the user device upon execution of the associated code portion by the user device, sending a data set to the user device, the data set including multiple settings stored by the user device, each of the settings associated with one of the code portions, and sending a toggle signal to the user device remotely causing the user device to update one of the stored settings thereby enabling or disabling the function associated with the one stored setting.

The method includes monitoring communication traffic sent by the user devices over the network connection and, when an abnormal condition of the communication traffic is detected, automatically send the toggle signal based upon the detected abnormal condition. The method includes monitoring communication traffic sent by the user devices over the network connection and, when an abnormal condition of the communication traffic is detected, send the toggle signal in response to a manual input to the computing system.

The method includes wherein the computing system monitors communication traffic sent by the user devices over the network to detect abnormal conditions, the computing system including a digital feature toggle system having a database storing a plurality of toggle options, wherein when one of the abnormal conditions is detected the digital feature toggle system evaluates the detected abnormal condition and selects one of the toggle options to control the sending of the toggle signal. The method includes sending the toggle signal to disable the function based upon the selected toggle option. The method includes sending the toggle signal to less than all of the user devices connected to the network connection based upon the selected toggle option. The method includes sending the toggle signal to only ones of the user devices connected to the network and executing a predetermined version of the application code based upon the selected toggle option.

The toggle signal disables the function and includes duration information whereby the disabled function is enabled after a predetermined time from the disabling has elapsed based upon the duration information. The toggle signal disables the function and the one stored setting includes duration information whereby the associated code portion enables the disabled function after a predetermined time from the disabling has elapsed based upon the duration information.

The method includes sending the toggle signal to selected ones of the user devices based different groups of the user devices. The method includes sending the toggle signal to selected ones of the user devices based upon different ones of the application code and/or different versions of the application code.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
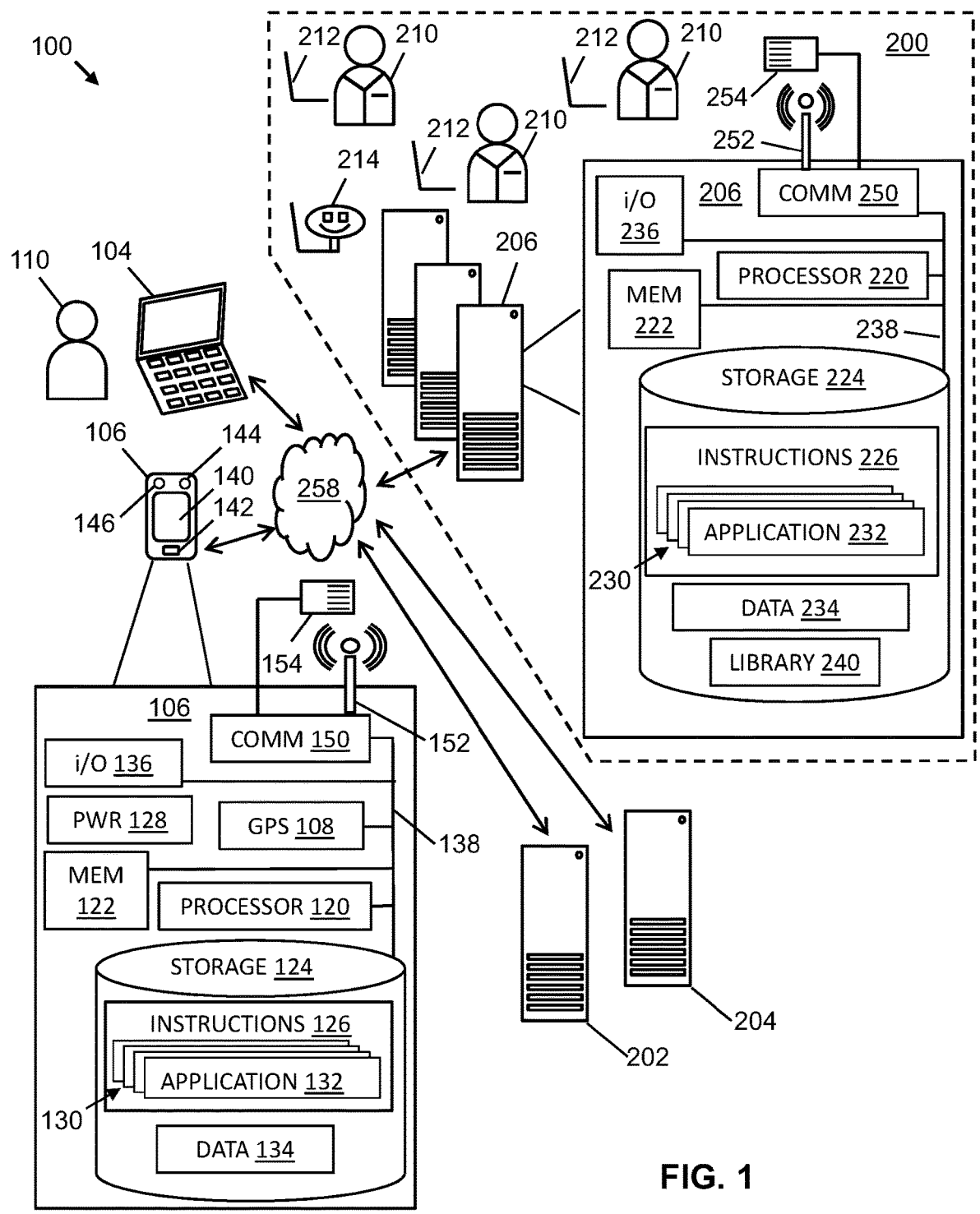

Having thus described embodiments of the invention in general terms, reference will now be made to the accompanying drawings, wherein:

FIG. 1 illustrates an enterprise system and environment thereof, in accordance with various embodiments of the invention.

Figure 2:
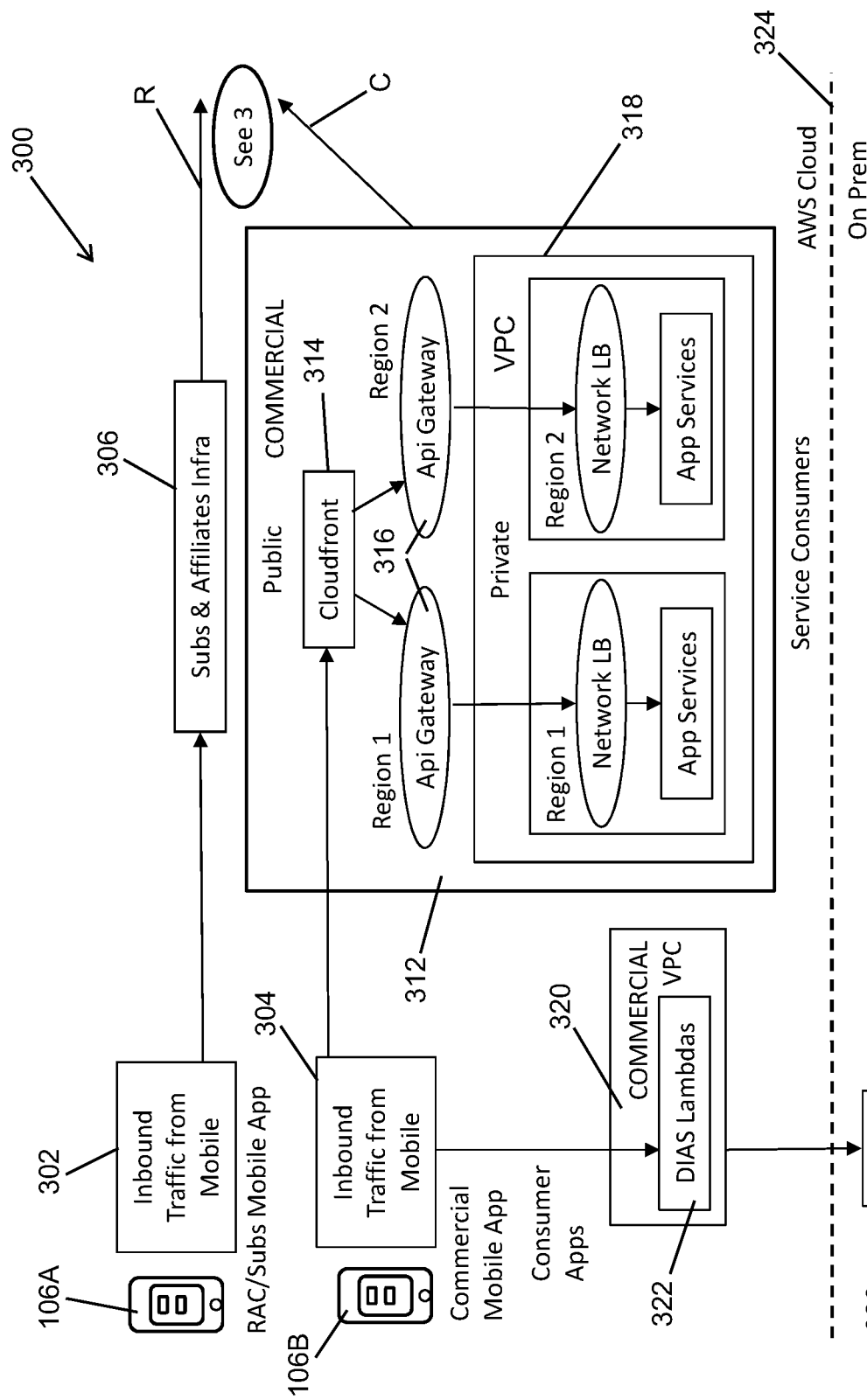
Figure 3:
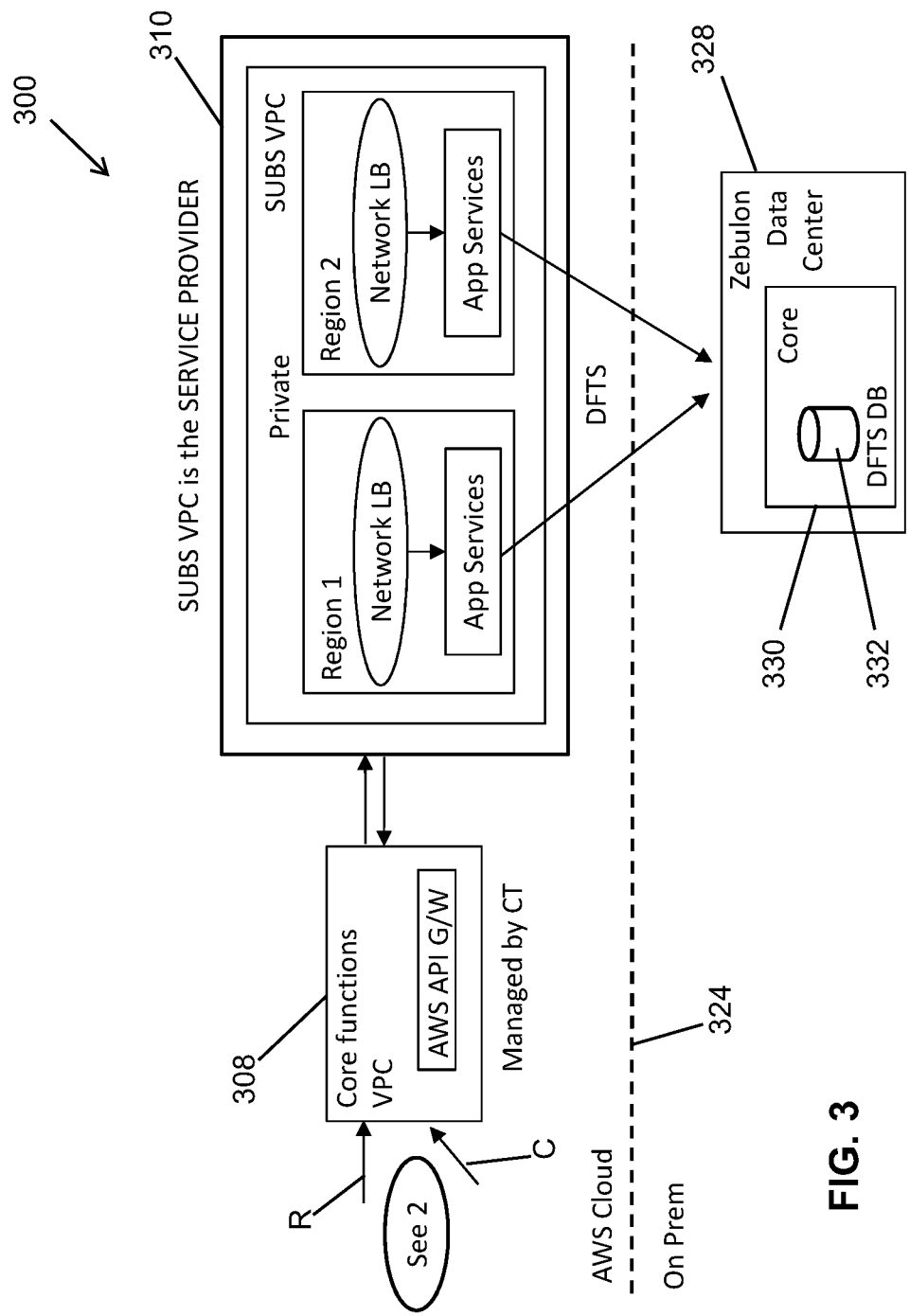

FIG. 2 and FIG. 3 are a block diagram of an apparatus for remotely controlling a user device function according to the invention.

Figure 4:
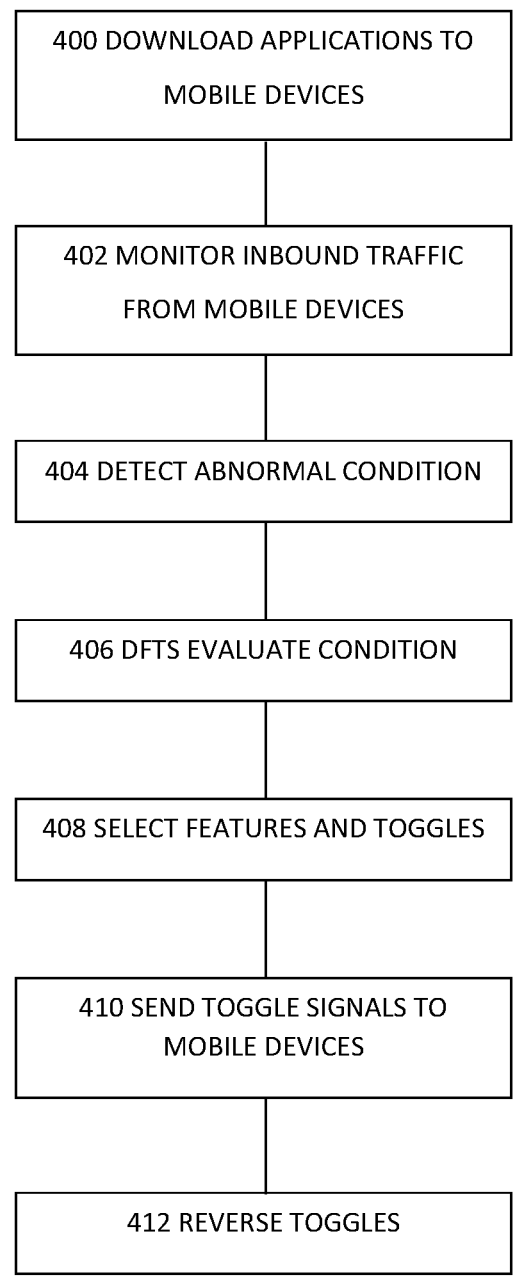

FIG. 4 is a flow diagram of a method for remotely controlling a user device function according to the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments.

Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application and/or a mobile P2P payment system client application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

An enterprise system 200, such as a bank, provides an application to enable the user 110 of the mobile device 106 to communicate with the computing system 206. The application includes features for performing various tasks and transactions. Typically, the application is available for downloading to the mobile device through a third party website such as Google Play for Android devices and Apple App Store for iOS devices. However, the applications available through these third parties cannot be quickly modified due to lengthy approval procedures that delay availability for, typically, 6 to 10 business days. Thus, the enterprise system 200 cannot respond to an emergency situation involving communication with mobile devices by immediately changing the application.

A digital feature toggle system (DFTS) according to the invention is shown in FIG. 2 and FIG. 3. The DFTS apparatus and method solve the problem of responding to the communication emergency described above by changing the behavior of the mobile device application on demand without changing the computer code. A computing system 300 enables multiple mobile device users to interact with an enterprise system to exchange information and to perform transactions. The DFTS serves as an interface to maintain banners, feature flags and versions supported for mobile applications. The following description of the DFTS invention uses a bank as an example of the enterprise system wherein the users are clients or customers of the bank. However, the DFTS invention can be used with any enterprise system that interacts with the mobile devices of its clients or customers using applications running on the mobile devices.

FIG. 2 shows a mobile device 106A that represents a plurality of mobile devices of private users that are retail customers of the bank. Retail customers typically are individual, non-business customers. However, an individual might use a retail account in connection with an unincorporated business venture. The retail customers use the mobile devices 106A to generate retail inbound communication traffic over a network connection 302 to the computing system 300. The inbound traffic is generated by running a RAC/Subs Mobile App application (retail app) on each of the mobile devices 106A.

Typically, not all of the mobile devices 106A are running the same retail app. For example, the bank releases updated versions of the retail app over time that incorporate changes displays and features. A user may not download a new version of the retail app to his/her mobile device 106A for any of various reasons. Therefore, several versions of the retail app can be communicating with the computing system 300 from the mobile devices 106A. Also, the bank could offer two or more retail apps having different features. Therefore, the inbound traffic can be generated from various retail apps and various versions of those retail apps. The same situation exists in relation to commercial users that communicate with mobile devices represented by the mobile device 106B to generate commercial inbound communication traffic over a network connection 304 to the computing system 300. The inbound traffic is generated by running a Commercial Mobile App application (commercial app) on each of the mobile devices 106B. Therefore, the inbound traffic can be generated from various commercial apps and various versions of those commercial apps.

The retail inbound traffic on the network connection 302 is processed through a Subs & Affiliates Infrastructure 306 and transfers at R to a Core Functions Gateway VPC (virtual private cloud) 308 shown in FIG. 3. The gateway 308 can be an application programming interface (API) gateway (G/W) provided by a third party such as Amazon Web Services (AWS). The gateway 308 communicates with a SUBS VPC 310 that controls the services provided to the mobile devices 106A.

The commercial inbound traffic on the network connection 304 enters a COMMERCIAL sub-system 312 where it is processed through a cloudfront 314 and API gateways 316 to a VPC 318 similar to the VPC 310. The API gateways 308 and 316 provide a high level of security as they require an API key to authenticate and authorize a bank IT employee to do any provisioning related to the mobile device applications.

The commercial inbound traffic also enters a COMMERCIAL VPC 320 that includes a DIAS (data and information access services) Lambdas 322. Lambda is an event-driven, serverless computing platform provided by Amazon as part of AWS. Lambda is designed to enable developers to run code without provisioning or managing servers. It executes code in response to events and automatically manages the computing resources required by that code.

The components of the computing system 300 are separated between the AWS Cloud above the dashed line 324 and On Prem (bank on-premises) below the line 324. Thus, the VPC 320 in the AWS Cloud communicates with the ISAM 326 that is On Prem. ISAM is an acronym that refers to an indexed sequential access method for creating, maintaining, and manipulating computer files of data so that records can be retrieved sequentially or randomly by one or more keys.

The commercial inbound traffic transfers from the sub-system 312 at C to the gateway 308 shown in FIG. 3 and then to the SUBS VPC 310. The VPC 310 located in the AWS Cloud communicates with the DFTS in a bank data center 328 that is located On Prem. The data center 328 includes a plurality of processors 220 and storage 224 for maintaining the apps and the customer information. The data center 328 operates a DFTS core 330 with a DFTS database 332.

In a non-limiting example, FIG. 4 shows a flow diagram of a method according to the invention. In step 400, the computing system 300 downloads apps and updated versions of previously downloaded apps from storage in the data center 328 to the mobile devices 106A and 106B. Downloads can be done automatically when a mobile device has an app update feature turned on. The apps contain computer code that, when executed by a mobile device, enable a user of the mobile device to exchange information with the computing system 300. The computer code includes multiple code portions each of which, when executed, enables an associated function to be performed by the mobile device. For an app designed for use with a bank account of the user, such features as displaying a banner on the screen of the mobile device, making immediate payments from the bank account, chatting with a bank employee or an AI program, and access to a beta version of the app can be provided.

In a step 402, the computing system 300 monitors a volume of the inbound communication traffic over the network connections 302 and 304. The computing system 300 and the network connections 302 and 304 are designed to communicate with the mobile devices 106A and 106B at a predetermined speed until the volume of the inbound traffic reaches a predefined level at which time increased traffic volume reduces the communication speed and slows the response time. In a worst case, the traffic volume can reach a level at which the computing system 300 is unable to handle the load and a service outage occurs. The system and the method according to the invention operate to prevent service outages and to maintain acceptable communication volume and speed by selectively controlling the app functions that can be performed by the mobile devices generating the inbound traffic.

In a step 404, the computing system 300 detects an abnormal condition in the monitored inbound traffic. Non-limiting examples of abnormal conditions are the number of mobile devices communicating with the computing system exceeding a predetermined maximum devices number, the number of mobile devices using a particular feature exceeding a predetermined maximum feature number, and the volume of the inbound traffic having reached the predefined level. The detected abnormal condition triggers the DFTS 330 in a step 406 to evaluate the abnormal condition and determine the best available toggle option for maintaining acceptable communications with the mobile devices 106A and 106B. The step 406 can be performed automatically and/or with manual assistance.

The DFTS options are stored in the database 332 and include various combinations of toggling (turning on and off) the features incorporated in the apps, setting toggled off durations and selecting groups of users and/or different apps and/or different app versions for applying the toggles. When none of the options match the detected abnormal condition, a bank employee can manually input a selection of the toggle signal after gaining access using an API key. In a step 408, the selected option or manual toggle is applied and in a step 410 the computing system 300 disables the selected toggled function or functions by sending the associated toggle signal to the connected mobile devices. In a step 412, each of the toggled off features is turned on either because an associated off duration has timed out or the abnormal condition has subsided.

The app stored on the mobile device 106A or 106B includes a data set that has a setting for each of the app features to be controlled by the DFTS 330. These settings are an on/off toggle and, in some cases, include an off duration value for automatically turning the feature back on after a predetermined time has elapsed. In the step 410, the DFTS 330 sends a toggle signal through the computing system 300 and the network connection (302 or 304) to the mobile device (106A or 106B). The toggle signal causes the setting associated with the feature to toggle the feature off (disable). If the setting does not include a duration, the DFTS 330 either sends the duration value information with the toggle signal or sends another toggle signal in a step 412 to toggle the feature on (enable) after the predetermined time has elapsed. Thus, the features included in the mobile device apps can be remotely controlled by disabling and enabling without modifying the applications. For each of the features available in a mobile device app, the control can include: 1) whether a selected feature is available; 2) how long the selected feature is available; and 3) the mobile devices for which the selected feature is available.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A system for remotely controlling a user device function, the system comprising:
   a computing system including a processor and a non-transitory storage device, wherein the processor executes computer-readable instructions stored in the storage device;
   a network connection operatively connecting multiple user devices to the computing system; and
   wherein, upon execution of the computer-readable instructions, the computing system performs, for each of the user devices, steps comprising:
      sending an application code to each of the user devices, the application code including multiple code portions each associated with a function performed by the user devices upon execution of the associated code portion by the user devices;
      sending a data set to the user devices, the data set including multiple settings stored by the user devices, each of the settings associated with one of the code portions; and
      during subsequent communication between the user devices and the computing system over the network sending a toggle signal to the user devices remotely causing the user devices to update one of the stored settings wherein the user devices respond to the update of the one stored setting by enabling or disabling the function associated with the one stored setting.

2. The system according to claim 1 wherein the computing system monitors communication traffic sent by the user devices over the network connection and, when an abnormal condition of the communication traffic is detected, automatically sends the toggle signal based upon the detected abnormal condition.

3. The system according to claim 1 wherein the computing system monitors communication traffic sent by the user devices over the network connection and, when an abnormal condition of the communication traffic is detected, sends the toggle signal in response to a manual input to the computing system.

4. The system according to claim 1 wherein the computing system monitors communication traffic sent by the user devices over the network to detect abnormal conditions, the computing system including a digital feature toggle system having a database storing a plurality of toggle options, wherein when one of the abnormal conditions is detected the digital feature toggle system evaluates the detected abnormal condition and selects one of the toggle options to control the sending of the toggle signal.

5. The system according to claim 4 wherein the computing system responds to the selected toggle option by sending the toggle signal to disable the function.

6. The system according to claim 5 wherein the computing system responds to the selected toggle option by sending the toggle signal to less than all of the user devices connected to the network connection.

7. The system according to claim 5 wherein the computing system responds to the selected toggle option by sending the toggle signal to only ones of the user devices connected to the network and executing a predetermined version of the application code.

8. The system according to claim 1 wherein the user devices respond to the toggle signal by disabling the function and the toggle signal includes duration information whereby the disabled function is enabled by the user devices after a predetermined time from the disabling has elapsed based upon the duration information.

9. The system according to claim 1 wherein the user devices respond to the toggle signal by disabling the function and the one stored setting includes duration information whereby the associated code portion causes the user devices to enable the disabled function after a predetermined time from the disabling has elapsed based upon the duration information.

10. A method for remotely controlling a user device function, the method comprising the steps of:
   providing a computing system including a processor and a non-transitory storage device, wherein the processor executes computer-readable instructions stored in the storage device;
   establishing network connection operatively connecting multiple user devices to the computing system; and
   wherein, upon execution of the computer-readable instructions, the computing system performs, for each of the user devices, the following steps,
   sending an application code to each of the user devices, the application code including multiple code portions each associated with a function performed by the user devices upon execution of the associated code portion by the user devices;
   sending a data set to the user devices, the data set including multiple settings stored by the user devices, each of the settings associated with one of the code portions; and
   during subsequent communication between the user devices and the computing system over the network sending a toggle signal to the user devices remotely causing the user devices to update one of the stored settings wherein the user devices respond to the update of the one stored setting by enabling or disabling the function associated with the one stored setting.

11. The method according to claim 10 including monitoring communication traffic sent by the user devices over the network connection and, when an abnormal condition of the communication traffic is detected, automatically sending the toggle signal based upon the detected abnormal condition.

12. The method according to claim 10 including monitoring communication traffic sent by the user devices over the network connection and, when an abnormal condition of the communication traffic is detected, sending the toggle signal in response to a manual input to the computing system.

13. The method according to claim 10 wherein the computing system monitors communication traffic sent by the user devices over the network to detect abnormal conditions, the computing system including a digital feature toggle system having a database storing a plurality of toggle options, wherein when one of the abnormal conditions is detected the digital feature toggle system evaluates the detected abnormal condition and selects one of the toggle options to control the sending of the toggle signal.

14. The method according to claim 13 including sending the toggle signal to disable the function based upon the selected toggle option.

15. The method according to claim 14 including sending the toggle signal to less than all of the user devices connected to the network connection based upon the selected toggle option.

16. The method according to claim 14 including sending the toggle signal to only ones of the user devices connected to the network and executing a predetermined version of the application code based upon the selected toggle option.

17. The method according to claim 10 wherein the user devices respond to the toggle signal by disabling the function and the toggle signal includes duration information whereby the disabled function is enabled by the user devices after a predetermined time from the disabling has elapsed based upon the duration information.

18. The method according to claim 10 wherein the user devices respond to the toggle signal by disabling the function and the one stored setting includes duration information whereby the associated code portion causes the user devices to enable the disabled function after a predetermined time from the disabling has elapsed based upon the duration information.

19. The method according to claim 10 including sending the toggle signal to selected ones of the user devices based different groups of the user devices.

20. The method according to claim 10 including sending the toggle signal to selected ones of the user devices based upon different ones of the application code and/or different versions of the application code.

* * * * *